United States Patent [19]

Buckingham et al.

[11] Patent Number: 5,138,799
[45] Date of Patent: Aug. 18, 1992

[54] PROBE POSITIONING MECHANISM FOR A RADIUS DRESSER

[75] Inventors: Stephen S. Buckingham; Walter C. Dodd; Daniel J. Keebler, all of Springfield, Vt.

[73] Assignee: Bryant Grinder Corporation, Springfield, Vt.

[21] Appl. No.: 685,227

[22] Filed: Apr. 12, 1991

[51] Int. Cl.⁵ .............................................. B24B 49/00
[52] U.S. Cl. ................................ 51/165 R; 51/165.71; 51/165.87; 51/5 D; 125/11.01; 125/11.03; 125/11.04; 125/11.11
[58] Field of Search ............ 51/105 R, 165.87, 165.88, 51/165.93, 5 D, 165.71; 125/11.01, 11.03, 11.04, 11.06, 11.07, 11.11, 11.18

[56] References Cited

U.S. PATENT DOCUMENTS

| | | | |
|---|---|---|---|
| 2,446,833 | 10/1948 | Johnson | 125/11.11 |
| 2,469,365 | 5/1949 | Braaten | 125/11.06 |
| 2,907,315 | 10/1959 | Hill | 125/11.07 |
| 3,651,605 | 3/1972 | Tittle . | |
| 3,897,659 | 8/1975 | Henry . | |
| 4,023,310 | 8/1978 | Nishimura et al. | 125/11.03 |
| 4,229,909 | 10/1980 | Dial, Sr. . | |
| 4,419,612 | 12/1981 | Reda et al. . | |
| 4,502,458 | 3/1985 | Unno et al. | 125/11.03 |
| 4,559,919 | 12/1985 | Kushigian | 125/11.04 |
| 4,561,415 | 12/1985 | Willot | 125/11.04 |
| 4,603,677 | 8/1986 | Gile et al. . | |
| 4,704,825 | 11/1987 | Moore . | |
| 4,899,718 | 2/1990 | Usutani et al. . | |
| 4,928,437 | 5/1990 | Waelti . | |
| 4,934,106 | 6/1990 | Setzer . | |
| 4,967,515 | 11/1990 | Tsujiuchi et al. . | |
| 5,003,730 | 4/1991 | Halvorsen . | |

Primary Examiner—M. Rachuba
Attorney, Agent, or Firm—Hamilton, Brook, Smith & Reynolds

[57] ABSTRACT

The present invention relates to systems and methods of controlling the dressing operation of computer numerically controlled grinding machines. A contact probe is positioned relative to a dresser and contact measurements are made to determine the position of the dresser tip relative to a pivot axis about which the dresser rotates.

20 Claims, 6 Drawing Sheets

PROBE POSITIONING MECHANISM FOR A RADIUS DRESSER

BACKGROUND OF THE INVENTION

Grinding machines having a wheel dresser with a diamond dresser carried on a pivotal holder arm have been used for dressing grinding wheels. The pivotal holder arm is pivotable about a substantially vertical axis to cause the diamond dresser to be moved in a circular or arcuate path against the grinding wheel to dress a circular path on the working face of the wheel. The diamond dresser is manually adjustable in position on the holder arm to vary the radius of the circular path traced by the dresser and thus the radius of the working surface dressed on the wheel.

Orthogonal dressing of a grinding wheel by a diamond dresser has also been developed, the diamond dresser being mounted on a pivotal holder. Coarse adjustment of the diamond dresser relative to the pivot line or axis of the holder is effected manually by a set screw that slides a dresser support plate relative to the pivotal holder. Fine adjustment of the diamond dresser relative to the pivot line is provided by a manually turned threaded adjustment screw that deflects a plate carrying the diamond dresser. In this way, the radius of the circular path of the dresser can be varied.

Alternatively, the rotary dresser wheel can be carried on a compound slide assembly that is controlled by an electronic control system. The dresser wheel moves along an axis relative to the grinding wheel under control of an automatic computer numerically controlled (CNC) system which controls movement of the grinding wheel and table during grinding operations. A need exists, however, to improve control of the dressing operation to provide more consistent dressing of grinding surfaces during the lifetime of each dresser.

SUMMARY OF THE INVENTION

The present invention relates to a radius dresser apparatus for dressing or truing a grinding wheel wherein a dresser member is carried on a pivotal support or holder arm and the dresser is adjustable in position on the pivotal holder arm to vary the position of the dresser member relative to the pivot axis about which the holder arm rotates. A contact probe, whose structure and operation are described in detail below, is mounted on the dresser apparatus that can be positioned about the pivot axis and used to accurately measure the position of the dresser tip relative to the pivot axis.

Adjustment of the dresser position is effected by an actuator on the pivotal holder arm controlled by a control computer using a stored dresser program in combination with dresser feedback position signals. In connection with the dressing of a grinding wheel, the dresser program is correlated with workparts to be ground with different radius-defined surfaces so as to automatically dress one or more grinding wheels with different radius-defined working surfaces for grinding the workparts.

In a typical working embodiment of the invention, the dresser member is disposed on a "P-axis" slide that is moveable on the pivotable holder arm. The slide is driven in turn by a radius setting motor, such as a servo-motor, on the grinding machine and under control of the machine CNC unit. The CNC unit uses a stored dresser program and closed loop dresser position feedback signals from a position transducer associated with the radius setting motor.

After a number of dressing cycles the dresser tip is typically worn down so that the distance between the dresser tip, and the pivot axis of the dresser has altered. The contact probe is used to periodically measure the position of the dresser to correct for any change in the position of the dresser tip due to wear, or any other reason.

The probe is preferably mounted by a rotatable arm onto the dresser housing and can be actuated by an hydraulic unit that is electrically controlled by the computer or microprocessor of the CNC unit. The probe is rotated from a storage position to a measuring position at the direction of the operator or by a stored program. The probe has first and second contact surfaces which the dresser contacts and thereby generates a contact signal which indicates at what position the dresser is located upon contact with the probe. After measuring the first contact the P-axis is rotated 180 degrees about the pivot axis to be brought into alignment with the second contact surface and the dresser is again linearly translated along the slide until the dresser contacts the opposite side of the probe on the second contact surface. The two recorded contact positions of the dresser can be processed or averaged to accurately calculate the position of the dresser tip relative to the pivot axis.

DETAILED DESCRIPTION

Figure 1:
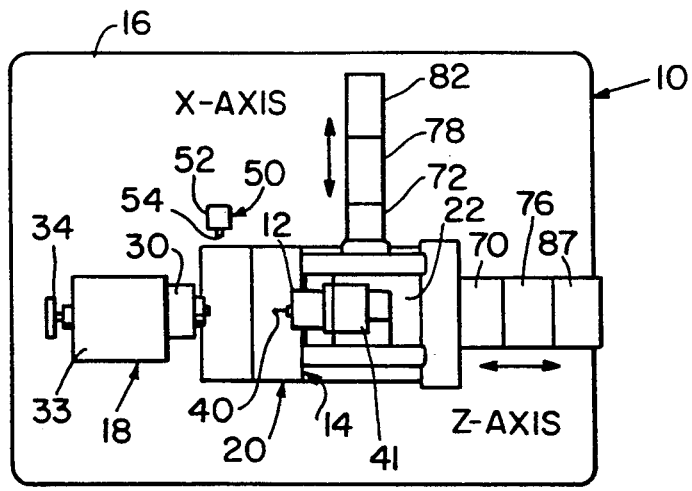
FIG. 1 schematically illustrates a preferred embodiment of a grinding machine that utilizes the present invention.

Referring to FIG. 1, the numeral 10 generally designates a one-station electro-mechanical internal grinding machine with a single grinding wheel spindle 12 on a compound slide assembly 14.

The grinding machine 10 includes a conventional bed or base member 16 on which is operatively mounted a conventional workhead 18. The compound slide assembly 14 is also mounted on the base member 16 and includes a longitudinal or Z-axis slide 20 mounted on base 16 and a cross or X-axis slide 22 operatively mounted on Z-axis slide 20. The wheel spindle can be moved simultaneously in the Z-axis and X-axis directions by slides 2Q and 22.

The workhead 18 may be of any suitable conventional structure and includes a chucking fixture 30 for holding a workpiece. The chucking fixture 30 may be of the centerless type and rotated by a motor 33 and pulley 34 on the workhead 18.

As shown in FIG. 1, a grinding wheel 40 is operatively held in the spindle 12 which is rotated by motor 41. By movement of the Z-axis and X-axis slides 20 and 22, the grinding wheel 40 can be moved to and from the workpiece held in chucking fixture 30 and into contact with the workpiece; e.g., into contact with an inner bore, to grind the workpiece.

The grinding wheel 40 is also movable by the Z-axis and X-axis slides 20 and 22 to and from the dresser apparatus 50 located laterally toward the side of the base member 16. In the embodiment shown in FIG. 1, the dresser 50 includes a support base 52 fixed in position on the base member so that the grinding wheel 40 is brought to and from the dresser apparatus 50 to effect dressing thereof. The dresser will be described in greater detail hereinbelow.

Figure 2:
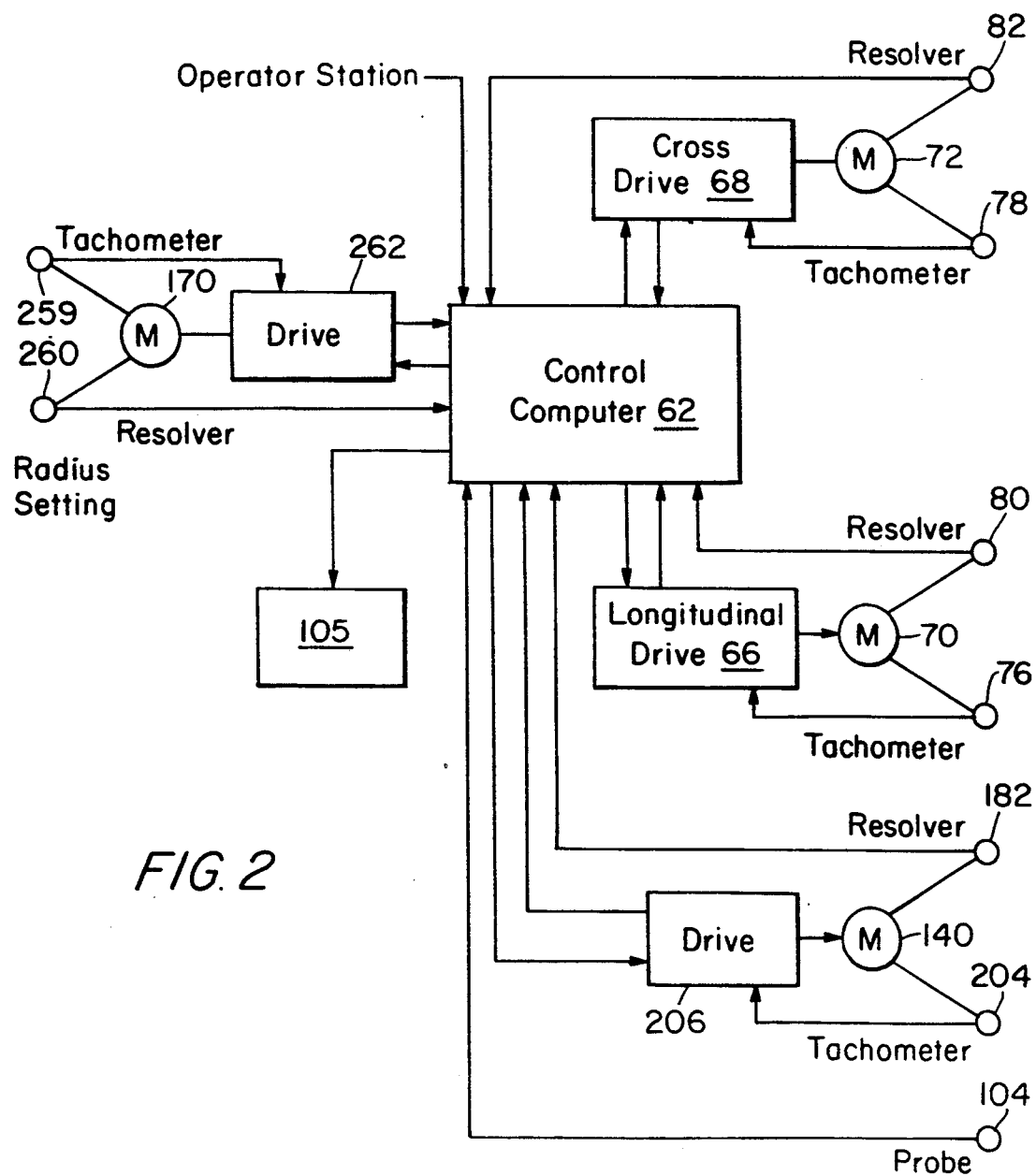
FIG. 2 is a schematic illustration of a control system for a grinding machine employing the dresser positioning of the invention.

A block diagram of the control system employed to control movements of the Z-axis and X-axis slides 20 and 22 as well as pivoting of the dresser holder arm and translation of the dresser member is illustrated in FIG. 2. The numeral 62 generally designates a control computer or data processor having a memory which is programmed to control all machine functions and interlocks. Such functions include lubrication status, safety interlocks, motor status and operation control station information. The control computer 62 may be any suitable digital computer or microprocessor.

The control computer 62 has stored the positions and rates for all the axis moves for the various sequences which may include a grind cycle, dress cycle and so forth. The control computer 62 sends servo drive signals to the servo drive means 66 and 68 for controlling the servo motors 70, 72 with respect to the respective Z-axis and X-axis slides to cause the grinding wheel to move in the desired wheel contour path. The servo drive means 66, 68 take feedback from the tachometers 76, 78 respectively. The numerals 80, 82 designate either resolvers, encoders or "INDUCTOSYN" transducers and they provide feedback signals to the control computer 62 in closed servo loop manner, with the tachometers closing inner loops. Reference numerals 80 and 82 could also be laser interferometers or other linear displacement transducers, such as magnetic or optical scales.

Further details regarding the computer and other control, drive and feedback system components are set forth in U.S. Pat. No. 4,805,585 that is incorporated herein by reference.

The Z-axis and X-axis slides 20, 22 are driven and controlled by the control system described above by a conventional ball screw or other screw means rotated by servo motors, 70, 72 as explained in U.S. Pat. No. 4,419,612 issued Dec. 6, 1983 of common assignee, the teachings of which are incorporated herein by reference. The operation of such a grinding machine 10 in the grinding mode under control of a control computer is described in detail in the aforementioned U.S. Pat. No. 4,419,612.

In the wheel dressing mode, the Z-axis and X-axis slides 20, 22 are sequenced by the control system described hereinabove to convey the grinding wheel 40 to the dresser apparatus 50 located adjacent the side of the machine on base member 16.

Figure 3:
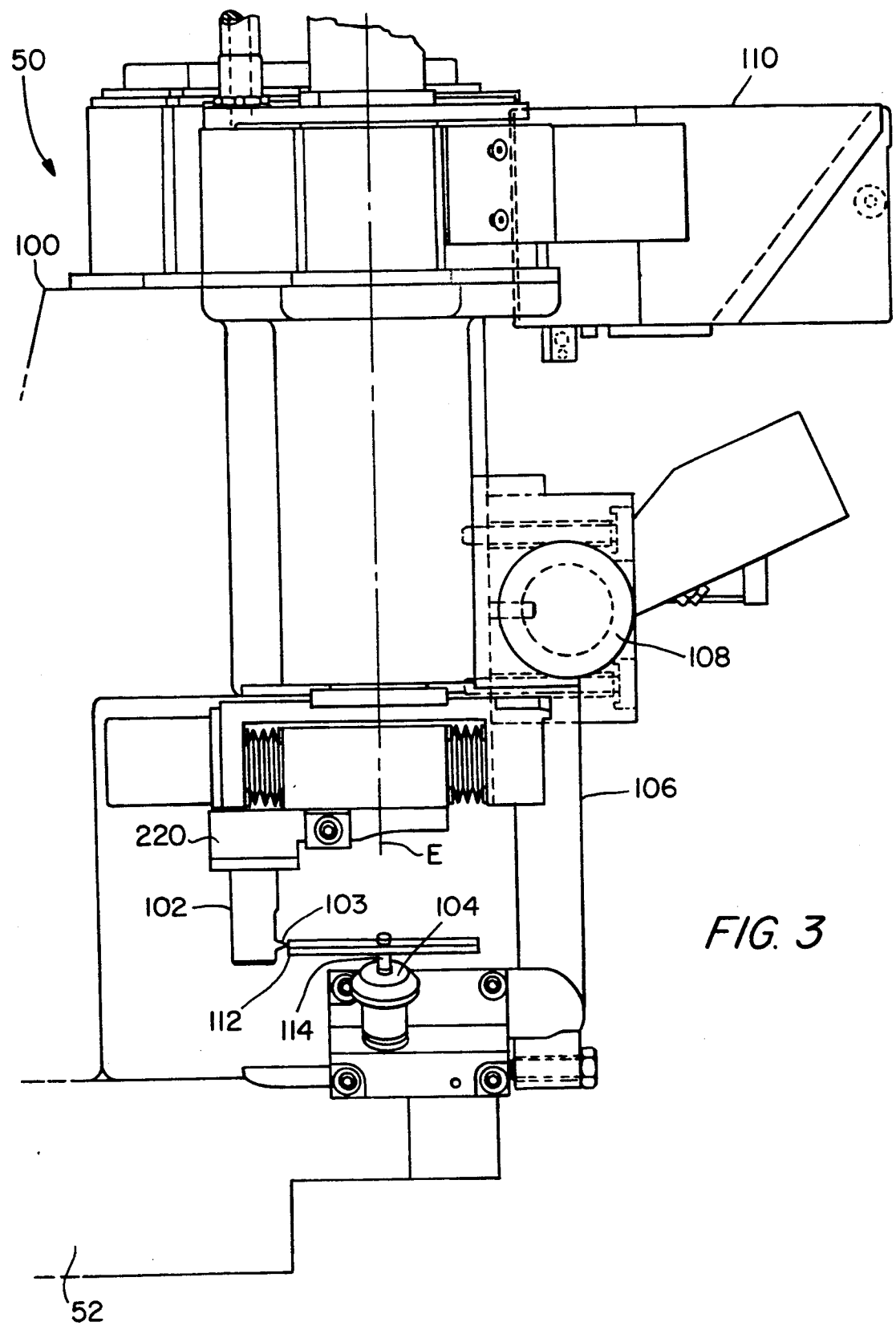
FIG. 3 is a side elevation of a preferred embodiment of the positioning mechanism for the dresser.

The dresser apparatus 50 includes a dresser housing 100 on dresser base 52 as illustrated in FIG. 3. Mounted pivotably on housing 100 is a pivotal or rotatable dresser holder arm 102. Dresser arm 102 is pivotably mounted so that the dresser arm can be rotated angularly to dress or true a particular convex or concave radius onto a grinding wheel. The control system described above can be used to maintain orthogonality of the dresser to the tangent plane of the surface being dressed. The details of the orthogonal dressing operation are set forth in U.S. Pat. No. 4,603,677 which is incorporated herein by reference.

Control computer 62 also has input and stored therein control information to position the dresser carriage member 220 and dresser tip 103 at a desired position relative to pivot axis E for a particular dimension (radius) and shape of working surface on the grinding wheel. The dresser tip 103 is said to be diplaced along a P-axis slide by linear translation of the dresser carriage relative to the slide. The dresser tip 103 can be moved automatically by the control computer 62 in accordance with a stored dresser program correlated with a stored workpart program for effecting grinding of different radius defined surfaces on the same workpart or on different workparts. The operator of the grinding machine would not be required to manually reset the position of the dresser tip 103 as in the past.

To this end, the radius setting motor 170 is a servo motor that includes a tachometer 259 and an encoder or resolver 260 as a dresser feedback position transducer interfacing with servo drive means 262 through control computer 62. Control computer 62 uses the stored dresser control information in combination with servo loop feedback from resolver 260 to control and to adjust the position of the dresser tip 103 on arm 102 relative to pivot axis E so as to dress the same or different grinding wheels with working surfaces defined by different radii. The dressed grinding wheel is of course used to grind the different radius defined surfaces on the same or different workparts. Servo motor 170, servo drive means 262 and resolve 260 can be of the commercially available type described above.

With computer control of the radius setting motor 170 and thus of the position of dresser tip 103 relative to the pivot axis E, a first set of multiple workparts to be successively ground with a certain radius and shape of grinding wheel can be ground followed by a second set of multiple workparts to be successively ground by a wheel with a different radius and/or shape. The dresser tip 103 would be automatically positioned in accordance with a dresser program in the computer control to dress the first wheel radius/shape for the first set of workparts and then repositioned to dress the second wheel radius/shape for the second set of workparts and so on for other workparts to be ground. Additional details regarding structure and operation of the P-axis slide can be found in U.S. Pat. No. 4,805,585.

To maintain a proper dressing operation during the the lifetime of the diamond tip 103 of the dresser it is advisable to determine the precise relationship between the dresser tip 103 and the surface being dressed. In a preferred embodiment of the present invention a probe 104 is employed to accurately measure the distance between the dresser tip 103 and an axis E about which the dresser rotates. The probe 104 is rotated by support arm 106 such that the probe 104 is centered along axis E. The support arm 106 is mounted on a bearing 108 and is driven by an hydraulic cylinder and rotary actuator 105 (not shown) that is instructed by the control computer to rotate between a first position within enclosure 110 to a second measuring position adjacent the dresser tip 103.

Figure 4:
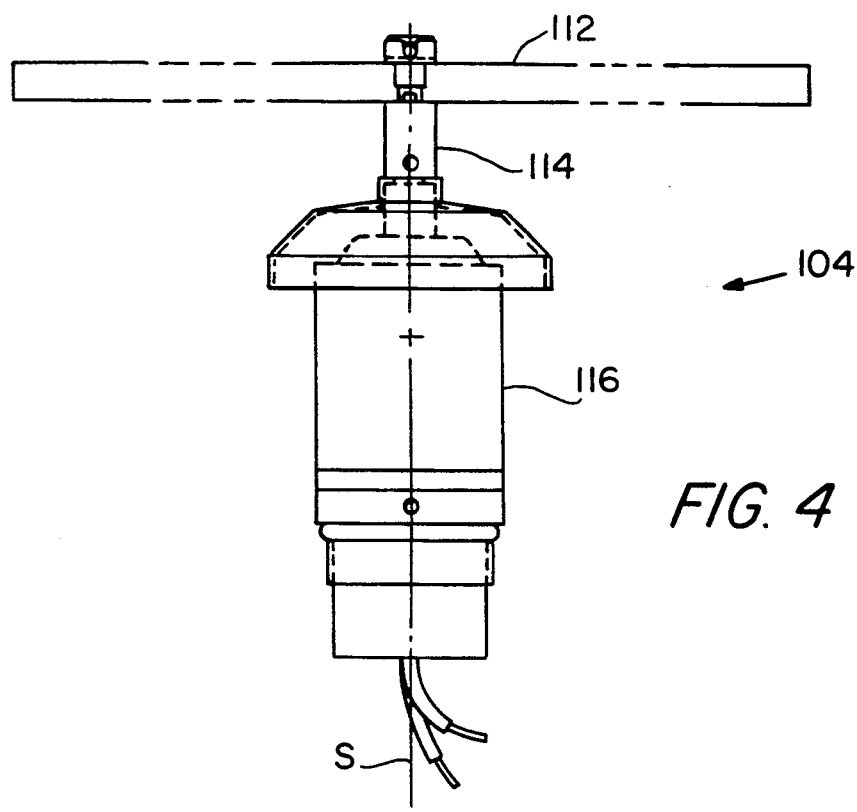
FIG. 4 is a side view of a preferred embodiment of a contact probe to be used in accordance with the invention.
Figure 5:
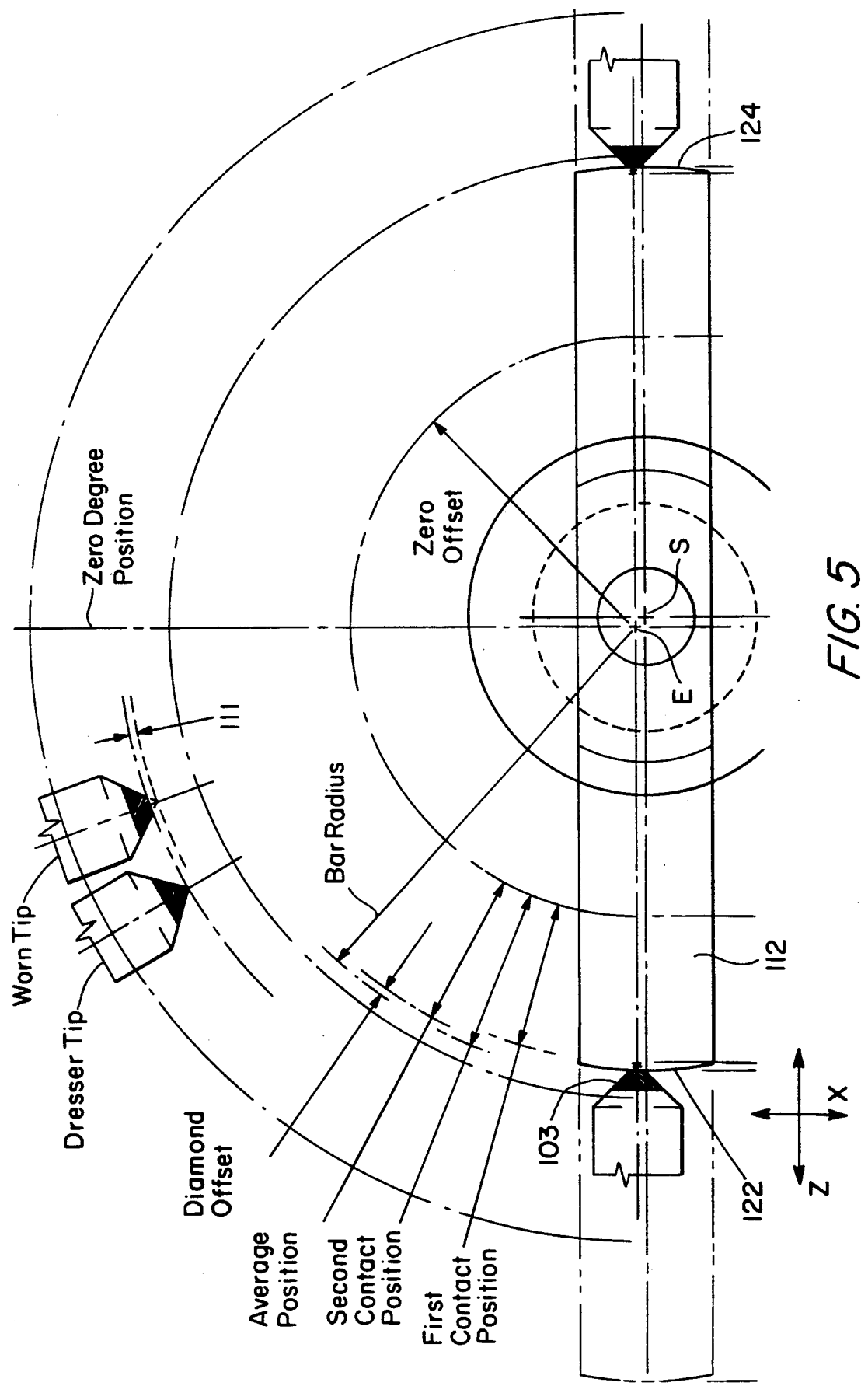
FIG. 5 is a detailed top view illustrating a preferred method of measuring the position of a dresser relative to a pivot axis.

The probe 104 generally comprises a probe stylus bar 112 having a known fixed length. As shown in FIGS. 4 and 5 at each end of the bar 112, a contact surface is provided that is suitable for contact by the dresser tip. Both the first and second contact surfaces are spherical in shape about the center of the bar 112. The radius of this sphere is therefore equal to half of the length of bar 112. Any small rotational misalignment of the bar 112 will not affect the measurement as a result of this geometry. The stylus bar 112 is mounted on a stylus extension member 114 which can rotate away from the longitudinal axis S of the probe 104. The extension member 114 is mounted in probe body 116 to permit rotational overtravel of the extension member 114 and the stylus bar 112 that is rigidly secured thereto. The probe body 116 contains a contact sensor that generates an electrical signal upon contact of the bar 112 with some external body, which for the present invention is the dresser tip 103.

The probe body 116, sensor and stylus extension are commercially available from Renishaw Inc., 623 Cooper Count, Schaumburg, Ill. 60173.

Operation of the probe positioning system is more clearly illustrated in connection with FIG. 5. The stylus bar 112 is centered on the probe axis S in its non-displaced position. This axis S is preferably aligned with the E-axis, but may be offset 120 by a few thousandths of an inch from the center of the pivot axis E of the dresser apparatus. However any Z-axis misalignment, which might occur due to rotation of the probe so that the S-axis is not perfectly aligned with the Z-axis, will automatically be corrected as a result of the two point contact method. The use of two contact measurements is preferably done 180 degrees apart to maximize accuracy However, any angular displacement between 90 and 270 degrees can be used to provide the correction.

The dresser tip 103 is first brought into position adjacent a first contact surface 122 of the stylus bar moved into contact therewith. The probe 104 generates a signal upon contact and delivers the signal to the computer. This contact signal identifies the precise position of the dresser tip in conjunction with the position feedback control system of the dresser slide described in greater detail above.

The dresser tip 103 is then rotated 180 degrees about axis E and brought in contact with a second contact surface 124 of probe 104. A second contact signal is then generated to identify the second contact position of the dresser tip. The first and second contact positions are then averaged and the result compared with the radius of the bar 112 to provide the P-axis diamond offset. This diamond offset is used to provide the exact radial distance of the dresser tip to the axis E. The dressing profile data for a particular grinding surface is then corrected accordingly.

Figure 6:
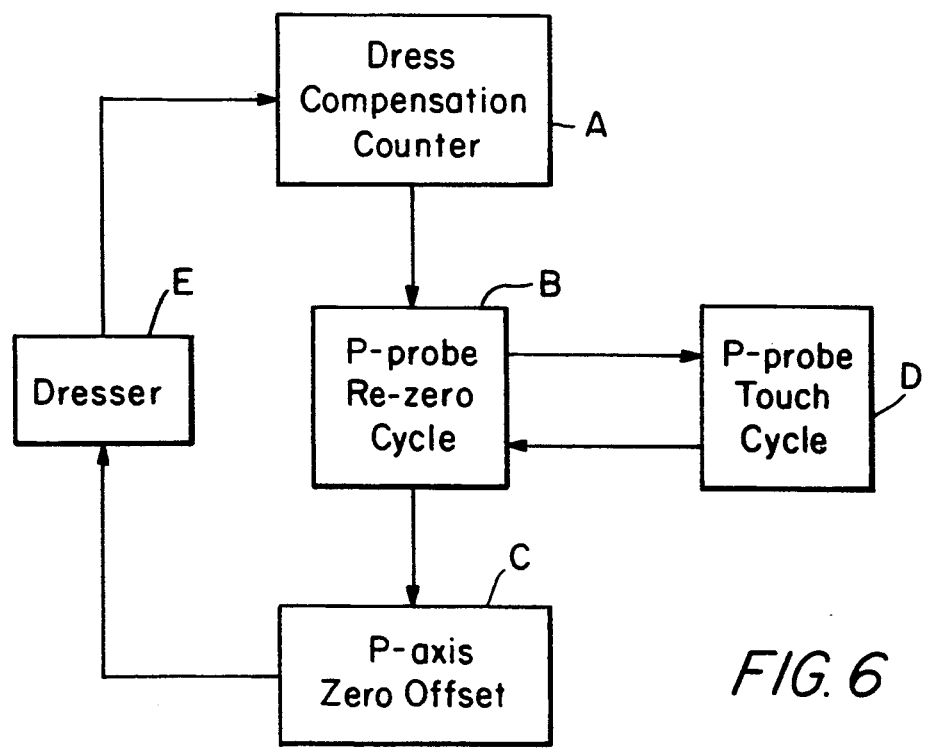
FIG. 6 is a process flow diagram illustrating a method of measuring the dresser position.
Figure 7:
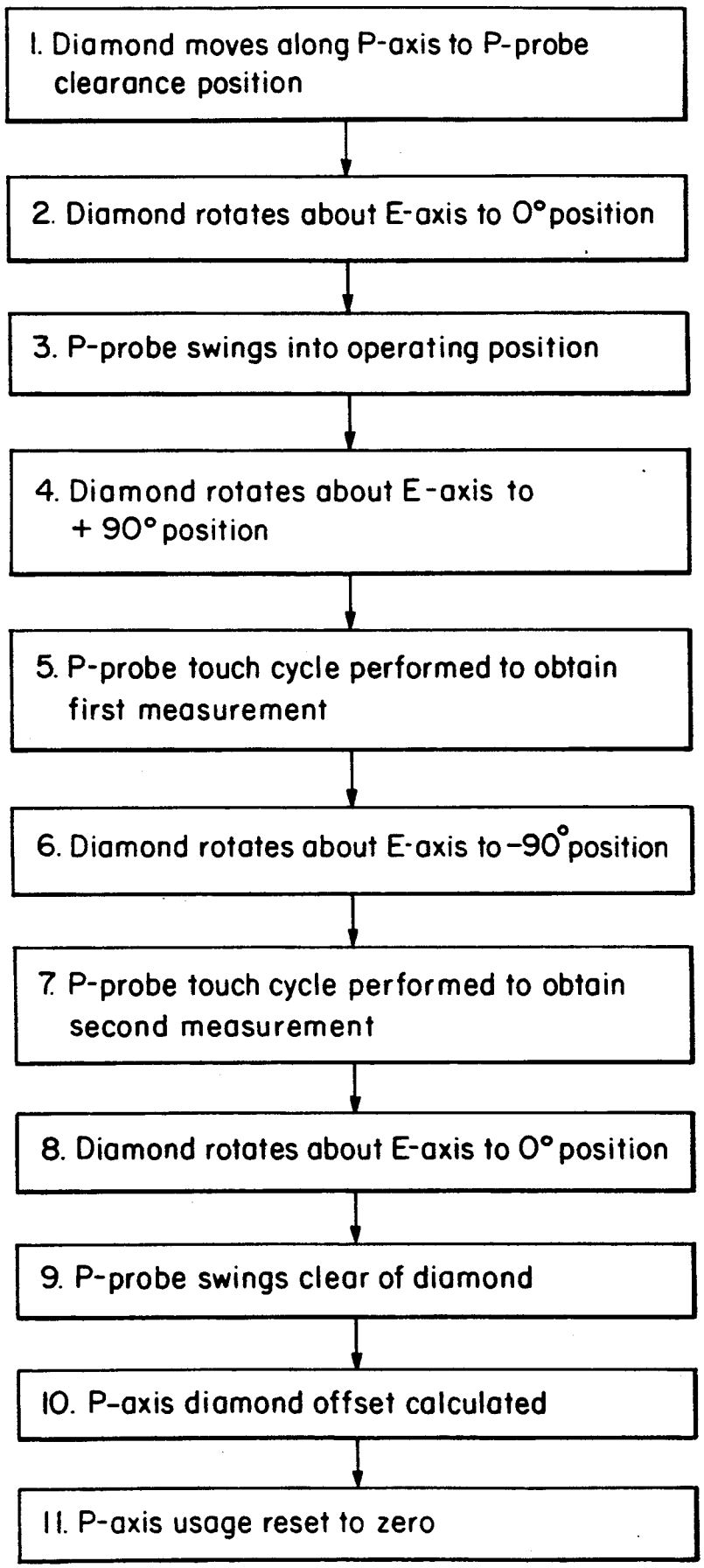
FIG. 7 is an additional process flow diagram providing a more detailed illustration of the zeroing process of the invention.
Figure 8:
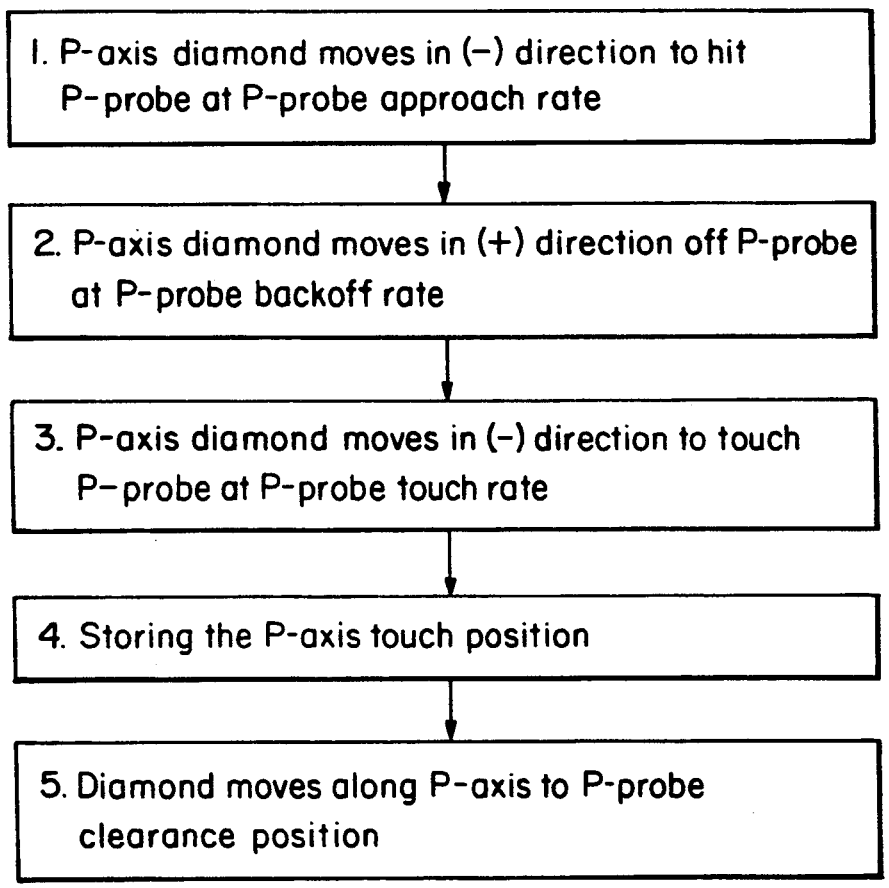
FIG. 8 is another process flow diagram illustrating the details the probe contact cycle.

FIGS. 6, 7 and 8 are flow charts which illustrate the operation of the dresser P-probe re-zero cycle. FIG. 6 illustrates an overview of the process. A dress compensation counter at Block A keeps track of dress compensation against the P-axis dresser and causes a re-zero cycle when this compensation becomes greater than an operator programmed amount, "p-axis re-zero trip". Thus, after the operator initiates the re-zero cycle, monitoring is repeated each time the trip threshold is exceeded.

Block B represents the P-probe re-zero cycle, which is illustrated in detail in the flow chart of FIG. 7. The P-Probe re-zero cycle begins with the diamond moving along the P-axis to the P-Probe clearance position. The diamond then rotates about the E-axis to the zero degree position, as shown in FIG. 5, that is orthogonal to the longitudinal axis of stylus bar 112 in this embodiment. The P-probe swings into its operating position and the diamond rotates about the E-axis to the first position. A first measurement of the diamond position along the P-axis is obtained by performing a P-probe touch cycle.

FIG. 8 shows a flow chart which illustrates the P-probe touch cycle. Initially, the diamond moves along the P-axis direction to hit the probe stylus bar 112 at the P-probe approach rate. The diamond then moves along the p-axis direction away from the P-probe at the P-probe backoff rate. The diamond resumes moving toward the first contact surface of bar 112 along the direction of the P-axis to touch the P-probe at the P-probe touch rate. The detected p-axis position of the diamond is stored in memory. Finally, the diamond moves along the P-axis to the P-probe clearance position to complete the P-probe touch cycle.

FIG. 7 illustrates the continuation of the P-probe re-zero cycle. After making the first measurement, the diamond is rotated 180 degrees about the E-axis to the second position. At this second measurement position, a second P-probe touch cycle is performed, as noted above, to obtain a second measurement of the diamond position.

After making the second measurement, the diamond is rotated about the E-axis to the 0 degree position and the P-probe swings clear of the diamond. The P-axis diamond offset is calculated from the first and second measurements as set forth above. Finally, the P-axis usage is reset to zero.

Returning to FIG. 6, it can be seen that the calculated P-axis zero offset can be used to recalibrate the dresser. The dresser is then monitored by the dress compensation counter to determine when the next P-probe re-zero cycle should occur.

Although certain preferred embodiments of the invention have been described above and illustrated in the Figures, those skilled in the art may recognize other equivalents to the specific embodiments described which are intended to be encompassed by the following claims.

We claim:

1. A dresser positioning system for a computer numerically controlled grinding machine comprising:
   a dresser mounted on a dresser slide, the dresser being linearly moveable relative to the dresser slide and rotatable about a pivot axis;
   a position sensor to measure a position of the dresser relative to the dresser slide and to generate a first electrical signal representative of the dresser slide position;
   a probe having a first contact surface, a second contact surface, and a contact sensor such that the contact sensor generates a second electrical signal upon contact at the first contact surface or the second contact surface by the dresser; and
   a data processor electrically connected to the position sensor and the contact sensor such that the data processor receives the first slide position electrical signal and the second contact electrical signal, the data processor having a memory in which to store position data representative of the dresser position when the dresser contacts the first and second contact surfaces of the probe.

2. The dresser positioning system of claim 1 wherein the probe is moveably mounted onto a dresser housing such that the probe can be positioned in a storage position and moved into a measuring position adjacent the dresser.

3. The dresser positioning system of claim 2 further comprising a support arm on which the probe is mounted and secured to the housing, the support arm being rotated relative to the housing by a motor.

4. The dresser positioning system of claim 2 wherein the measuring position is located substantially along the pivot axis.

5. The dresser positioning system of claim 1 wherein the probe comprises a displaceable member such that the first contact surface is on a side of the member opposite the second contact surface.

6. A method for adjusting the dressing of a working surface of a grinding wheel comprising:
   adjustably mounting a dresser member on a pivot arm and having a pivot axis about which the dresser member can rotate;
   positioning a probe and the dresser member such that the dresser member is in contact with the probe at a first position and generating a first position electrical signal to identify the position of the dresser member upon contact with the probe;
   storing said first position signal identifying the first contact position of the dresser member;
   positioning said dresser member at a second position such that the dresser member is in contact with the probe and generating a second position electrical signal to identify the position of the dresser member upon contact with the probe;
   storing said second position signal of the dresser member;
   determining the dresser member position relative to the pivot axis using the first and second position electrical signals; and
   adjusting the dressing of the working surface from the determined dresser member positions.

7. The method of claim 6 wherein the determining step further comprises averaging the first and second position signals.

8. The method of claim 6 wherein the first position comprises a first contact surface of the probe and the second position comprises a second contact surface that is located on the probe on a side opposite the first contact surface.

9. The method of claim 9 wherein the dresser member is rotated about the pivot axis from the first position to the second position.

10. The method of claim 9 wherein the dresser member is rotated through an angle of about 180 degrees from the first position to the second position.

11. The method of claim 6 further comprising providing a data processor having a memory in which to store the first and second position signals and to determine the dresser member position relative to the pivot axis.

12. The method of claim 6 further comprising providing a grinding wheel on a compound slide assembly and dressing the grinding wheel with the dresser member.

13. The method of claim 12 further comprising adjusting a position of the dresser member relative to the grinding wheel from the determined position of the dresser member relative to the pivot axis.

14. The method of claim 6 further comprising providing a slide assembly on which the dresser member is mounted.

15. A dresser positioning system for a computer numerically controlled grinding machine comprising:
   a grinding wheel mounted on a compound slide assembly;
   a dresser mounted on a dresser slide, the dresser being linearly movable relative to the dresser slide and rotatable about a pivot axis such that the dresser can be moved between a dressing position adjacent the grinding wheel and a probe measuring position;
   a position sensor to measure a position of the dresser relative to the dresser slide and to generate a first electrical signal representative of the dresser slide position;
   a probe positionable adjacent to dresser in the probe measuring position and having a first contact surface, a second contact surface, and a contact sensor such that the contact sensor generates a second electrical signal upon contact at the first contact surface or the second contact surface by the dresser
   a data processor electrically connected to the position sensor and the contact sensor such that the data processor receives the first slide position electrical signal and the second contact electrical signal, the data processor having a memory in which to store position data representative of the dresser position when the dresser contacts the first and second contact surfaces of the probe; and
   a servo drive system electrically connected to the data processor to control movement of dresser on the dresser slide and about the pivot axis.

16. The dresser positioning system of claim 15 wherein the probe is movable mounted onto a dresser housing such that the probe can be positioned in a storage position and moved into a measuring position adjacent the dresser.

17. The dresser positioning system of claim 16 further comprising a support arm on which the probe is mounted and secured to the housing, the support arm being rotated relative to the housing by a motor.

18. The dresser positioning system of claim 16 wherein the measuring position is located substantially along the pivot axis.

19. The dresser positioning system of claim 15 wherein the probe comprises a displacable member such that the first contact surface is on a side of the member opposite the second contact surface.

20. A method for adjusting the dressing of a working surface of a grinding wheel comprising:
   adjustably mounting a dresser member on a dresser slide and pivot support such that the dresser member can rotate about a pivot axis;
   providing slide position data rotary position data in a memory of a data processor and controlling movement of the dresser member with the slide and rotary position data;
   positioning a probe and the dresser member such that the dresser member is in contact with the probe at a position and generating a position electrical signal to identify the position of the dresser member upon contact with the probe;
   storing said position signal identifying the contact position of the dresser memory in the memory of the data processor;
   determining the dresser member position relative to the pivot axis using the stored position electrical signal; and
   adjusting the movement of the dresser member relative to the working surface from the determined dresser member position.

* * * * *